United States Patent
Chandak et al.

(10) Patent No.: US 11,421,100 B2
(45) Date of Patent: Aug. 23, 2022

(54) BLENDS OF LINEAR LOW DENSITY POLYETHYLENES

(71) Applicant: Univation Technologies, LLC, Houston, TX (US)

(72) Inventors: Swapnil B. Chandak, Lake Jackson, TX (US); Nitin Borse, Lake Jackson, TX (US)

(73) Assignee: UNIVATION TECHNOLOGIES, LLC., Houston, TX (US)

( * ) Notice: Subject to any disclaimer, the term of this patent is extended or adjusted under 35 U.S.C. 154(b) by 76 days.

(21) Appl. No.: 16/612,083

(22) PCT Filed: May 29, 2018

(86) PCT No.: PCT/US2018/034843
§ 371 (c)(1),
(2) Date: Nov. 8, 2019

(87) PCT Pub. No.: WO2018/222570
PCT Pub. Date: Dec. 6, 2018

(65) Prior Publication Data
US 2020/0095407 A1  Mar. 26, 2020

Related U.S. Application Data

(60) Provisional application No. 62/512,860, filed on May 31, 2017.

(51) Int. Cl.
C08L 23/08 (2006.01)

(52) U.S. Cl.
CPC ....... C08L 23/0815 (2013.01); *C08L 2203/16* (2013.01); *C08L 2205/025* (2013.01); *C08L 2207/066* (2013.01); *C08L 2314/02* (2013.01); *C08L 2314/06* (2013.01)

(58) Field of Classification Search
CPC ............... C08L 23/08; C08L 23/0815; C08L 2205/025; C08L 2207/066; C08L 2314/02; C08L 2314/06
See application file for complete search history.

(56) References Cited

U.S. PATENT DOCUMENTS

| | | |
|---|---|---|
| 6,403,717 B1 | 6/2002 | Adams et al. |
| 6,469,103 B1 | 10/2002 | Jain et al. |
| 7,122,607 B2 | 10/2006 | Hagerty et al. |
| 7,300,987 B2 | 11/2007 | Hagerty et al. |
| 7,507,780 B2 | 3/2009 | Hagerty et al. |
| 9,650,548 B2 | 5/2017 | Lee et al. |
| 2006/0173123 A1 | 8/2006 | Yang et al. |
| 2007/0260016 A1 | 11/2007 | Best et al. |
| 2008/0038533 A1 | 2/2008 | Best et al. |
| 2009/0317614 A1 | 12/2009 | Nilsen et al. |
| 2014/0179873 A1 | 6/2014 | Lam et al. |
| 2017/0349734 A1* | 12/2017 | Habibi ................ C08J 5/18 |

FOREIGN PATENT DOCUMENTS

| | | |
|---|---|---|
| EP | 1854841 | 11/2007 |
| KR | 2014002351 | 1/2014 |
| KR | 2016062727 | 6/2016 |
| WO | 1999014271 | 3/1999 |
| WO | 2016022581 | 2/2016 |
| WO | 2016091679 | 6/2016 |

OTHER PUBLICATIONS

Janzen, J., et al., "Diagnosing long-chain branching in polyethylenes," Journal of Molecular Structure, 1999, p. 569-584, vol. 485-486, Elsevier.

Hieber, C.A., et. al. "Shear-Rate-Dependence Modeling of Polymer Melt Viscosity," Polymer Engineering and Science, 1992, p. 931-938, vol. 32, No. 14.

Hieber, C.A., et. al. "Some correlations involving the shear viscosity of polystyrene melts," Rheologica Acta, 1989, p. 321-332, vol. 28, No. 4.

* cited by examiner

*Primary Examiner* — Ana L. Woodward

(57) ABSTRACT

A polyethylene blend comprising a uniform dispersion of constituents (A) and (B): (A) a Ziegler-Natta catalyst-made linear low density polyethylene and (B) a metallocene catalyst-made linear low density polyethylene, a composition comprising the polyethylene blend and at least one additive, methods of making and using same, and manufactured articles and films comprising or made from same.

10 Claims, No Drawings

BLENDS OF LINEAR LOW DENSITY POLYETHYLENES

FIELD

The field includes linear low density polyethylene blends and compositions containing same, methods of making and using same, and manufactured articles and films.

INTRODUCTION

A linear low density polyethylene ("LLDPE") is a substantially linear macromolecule composed of ethylene monomeric units and alpha-olefin comonomeric units. The typical comonomeric units used in commerce are derived from 1-butene, 1-hexene, or 1-octene. A LLDPE may be distinguished from a conventional low density polyethylene ("LDPE") any number of ways. Their respective manufacturing processes are different. LLDPE has substantially no detectable long chain branching per 1,000 carbon atoms, whereas conventional LDPE contains long chain branching. LLDPE has a narrower molecular weight distribution (MWD) relative to MWD of LDPE. LLDPE has different respective optical properties such as clarity (Zebedee), gloss, and haze.

US 2014/0179873 A1 to P. Lam, et al. (LAM) relates to a polymer blend comprising first and second polyethylene copolymers. The blend may be made into a film.

KR 2016062727A and KR2014002351A relate to polyethylenes and films.

SUMMARY

We recognized a problem that hurts the manufacturing and performance of prior LLDPE films. The films may have deficient film optical properties such as clarity, gloss, or haze.

A technical solution to this problem was not obvious. Many past attempts to improve (increase) optical properties of polyethylene films failed. A problem to be solved then is to discover an LLDPE film that has an improved film optical property.

Our technical solution to this problem includes a polyethylene blend (inventive blend) comprising a uniform dispersion of constituents (A) and (B): (A) a Ziegler-Natta catalyst-made linear low density polyethylene (ZN-LLDPE) and (B) a metallocene catalyst-made linear low density polyethylene (MCN-LLDPE). We discovered that when the ZN-LLDPE has a first combination of properties and the MCN-LLDPE has a second combination of properties, and the ZN-LLDPE and MCN-LLDPE are uniformly mixed together in certain relative amounts, the result is a blend that has at least one enhanced optical property such as enhanced (increased) clarity, enhanced (increased) gloss, and/or enhanced (decreased) haze, all relative to the respective optical property that would be expected for the blend based on films composed of the ZN-LLDPE alone or the MCN-LLDPE alone. Also inventive are a polyethylene composition comprising the inventive blend and at least one additive that is not (A) or (B) (inventive composition), a method of making the blend, a method of shaping the blend into an article, and a manufactured article composed of or made from the blend or composition.

DETAILED DESCRIPTION

The Summary and Abstract are incorporated here by reference.

The "enhanced optical property" for the inventive blend is described relative to the optical property of a first comparative film composed of the (A) ZN-LLDPE alone (100 wt % ZN-LLDPE/0 wt % MCN-LLDPE film) and optical property of a second comparative film composed of the (B) MCN-LLDPE alone (0 wt % ZN-LLDPE/100 wt % MCN-LLDPE film). Measure optical properties of comparative and inventive films according to ASTM D1746-15 for clarity (Zebedee), ASTM D2457-13 for gloss (specular), and ASTM D1003-13 for haze. Express optical property values for clarity (Zebedee), the measure of light that is scattered less than 1 degree (°) from the axis of incident light, as the ratio of light intensity with specimen to without specimen in the path of light as percent transmittance. Specular gloss is used primarily as a measure of the shiny appearance of films and surfaces at particular angle (e.g., 45°). Haze is expressed in percentage of luminous transmission which in passing through the film deviates from an incident beam by forward scattering. For comparison, use a film having a thickness of 0.0127 millimeter (mm, 0.500 mil) thick film. Alternatively films of other thickness may be compared, such as 0.0254 mm (1.00 mil), 0.0381 mm (1.50 mil), 0.0508 mm (2.00 mils), or 0.0635 mm (2.50 mils). Plot the optical property values for the first and second comparative films on a y-axis versus their respective weight fraction concentrations on an x-axis. Draw a comparative trend line (straight) from the optical property value for the first comparative film (100 wt % ZN-LLDPE/0 wt % MCN-LLDPE) to the optical property value for the second comparative film (0 wt % ZN-LLDPE/100 wt % MCN-LLDPE). Then plot the optical property value for each of the blends of (A) ZN-LLDPE and (B) MCN-LLDPE. Absence any enhancement, the optical property values for the blends (e.g., 75 wt % ZN-LLDPE/25 wt % MCN-LLDPE, 50 wt % ZN-LLDPE/50 wt % MCN-LLDPE, and 25 wt % ZN-LLDPE/75 wt % MCN-LLDPE) would be expected to fall on the comparative trend line.

Unpredictably, however, at least one optical property value for the inventive blend is above the comparative trend line. Thus, the inventive blend has at least one enhanced optical property. The extent of enhancement, indicated by the distance above the comparative trend line, may be expressed as an absolute optical property value, alternatively by a percentage increase above the comparative trend line. If an optical property value for any particular embodiment of a polyethylene blend lies on or below its comparative trend line, that particular embodiment is not included herein.

In some aspects the inventive blend embodiments fall within a weight fraction concentration range wherein the (A) ZN-LLDPE is from 15 to 75 weight percent (wt %) of the total weight of (A) and (B) and the (B) MCN-LLDPE is from 85 to 25 wt % of the total weight of (A) and (B). Embodiments of the inventive blend are not restricted to those weight fraction concentration ranges, however, provided that they are characterized by at least one optical property value that is above their respective comparative trend lines.

Certain inventive embodiments are described below as numbered aspects for easy cross-referencing. Additional embodiments are described herein.

Aspect 1. A polyethylene blend comprising a uniform dispersion of constituents (A) and (B): (A) a Ziegler-Natta catalyst-made linear low density polyethylene (ZN-LLDPE) and (B) a metallocene catalyst-made linear low density polyethylene (MCN-LLDPE); wherein the (A) ZN-LLDPE is from 11 to 79 weight percent (wt %) of the total weight of (A) and (B) and the (B) MCN-LLDPE is from 89 to 21 wt % of the total weight of (A) and (B); wherein by itself (A)

is independently characterized by properties (i) to (iii): (i) a melt index ("$I_2$", 190° C., 2.16 kg) of 0.5 to 2.5 gram per 10 minutes (g/10 min.) measured according to ASTM D1238-04; (ii) a density from 0.905 to 0.930 gram per cubic centimeter (g/cm$^3$), measured according to ASTM D792-13; and (iii) no detectable amount of long chain branching per 1,000 carbon atoms ("LCB Index"), measured according to LCB Test Method (described later); and wherein by itself (B) is independently characterized by properties (i) to (iii): (i) a melt index ("$I_2$", 190° C., 2.16 kg) of 0.5 to 2.5 g/10 min. measured according to ASTM D1238-04; (ii) a density from 0.905 to 0.930 g/cm$^3$, measured according to ASTM D792-13; and (iii) no detectable amount of long chain branching per 1,000 carbon atoms ("LCB Index"), measured according to LCB Test Method (described later); and with the proviso that the density of constituent (B) is within ±0.003 g/cm$^3$, alternatively ±0.002 g/cm$^3$, alternatively ±0.001 g/cm$^3$ of the density of constituent (A).

Aspect 2. The polyolefin blend of aspect 1, further characterized by one of limitations (i) to (vii): (i) each of ZN-LLDPE and MCN-LLDPE is independently characterized by a melt index of ("$I_2$", 190° C., 2.16 kg) of 0.5 to 1.99 g/10 min.; (ii) the melt index of constituent (B) is within ±0.4 g/10 min. of the melt index of constituent (A); (iii) both (i) and (ii); (iv) each of the ZN-LLDPE and MCN-LLDPE is independently characterized by a density of 0.918±0.003 g/cm$^3$; (v) the density of constituent (B) is within ±0.001 g/cm$^3$ of the density of constituent (A); (vi) both (iv) and (v); or (vii) both (iii) and (vi).

Aspect 3. The polyolefin blend of aspect 1 or 2, when formed as a film having a thickness of 0.0127 millimeter (0.500 mil), is further characterized by any one of limitations (i) to (vii): (i) an improvement (increase) in optical clarity (Zebedee), relative to optical clarity (Zebedee) of a film of (A) alone or (B) alone, of 3% to 35%, alternatively from 6% to 23%, alternatively from 3% to 31%, alternatively from 18% to 20%, all when tested according to the Optical Clarity-Zebedee Test Method described later; (ii) an improvement (increase) in gloss of from 15% to 65%, alternatively 49% to 57%, alternatively 33% to 59%, alternatively 27% to 64%, all when tested according to the Optical Gloss Test Method described later; (iii) an improvement (decrease) in haze of from 15% to 65%, alternatively 39% to 61%, alternatively 29% to 61%, alternatively 19% to 47%, all when tested according to the Optical Haze Test Method described later; or (iv) both (i) and (ii); (v) both (i) and (iii); (vi) both (ii) and (iii); or (vii) each of (i) to (iii). The improved optical property may be enhanced (increased) clarity, enhanced (increased) gloss, and/or enhanced (decreased) haze.

Aspect 4. A method of making the polyolefin blend of any one of aspects 1 to 3, the method comprising: (a) contacting discrete solid particles and/or a discrete melt of constituent (A) with discrete solid particles and/or a discrete melt of constituent (B) to give an initial mixture of (A) and (B); (b) heating any solid particles of (A) and any solid particles of (B) in the initial mixture above their melting temperature to give a complete melt of constituents (A) and (B); (c) blending the complete melt to an even extent to give the polyolefin blend as a uniform melt blend of constant composition of (A) and (B) throughout. If the initial mixture does not contain any solid particles of (A) and/or (B), then step (b) is unnecessary and may be omitted if desired. The expression "discrete solid particles and/or a discrete melt" means discrete solid particles, a discrete melt, or a combination thereof. E.g., see Blend and Film Preparation Method 1 later.

Aspect 5. The method of aspect 4, further comprising (d) cooling the uniform melt blend to a temperature below its solidification temperature, thereby giving the polyolefin blend as a solid of constant composition of (A) and (B) throughout.

Aspect 6. A polyolefin composition comprising the polyolefin blend of any one of aspects 1 to 3, or the polyolefin blend made by the method of aspect 4 or 5, and at least one additive (constituent) (C) to (M): (C) a lubricant; (D) a polymer processing aid; (E) an antioxidant; (F) a metal deactivator; (G) an ultraviolet light-promoted degradation inhibitor ("UV stabilizer"); (H) a slip agent; (I) a hindered amine stabilizer; (J) an antiblock agent; (K) a colorant; (L) an antifog agent; and (M) an antistatic agent; with the proviso that the total amount of the at least one additive is from >0 to 5 wt % of the polyolefin composition and the polyolefin blend is from <100 to 80 wt % of the polyolefin composition.

Aspect 7. A method of making the polyolefin composition of aspect 6, the method comprising contacting the polyolefin blend with the at least one additive (C) to (M) to give the polyolefin composition.

Aspect 8. A manufactured article comprising a shaped form of the polyolefin blend of any one of aspects 1 to 3, the polyolefin blend made by the method of aspect 4 or 5, or the polyolefin composition of aspect 6.

Aspect 9. A polyethylene film of the polyolefin blend of any one of aspects 1 to 3 or the polyolefin blend made by the method of aspect 4 or 5.

Aspect 10. A method of making a polyethylene film, the method comprising restricting in one dimension the polyethylene blend of any one of aspects 1 to 3 or the polyethylene blend made by the method of aspect 4 or 5 or the polyolefin composition of aspect 6, thereby giving the polyethylene film. E.g., see Blend and Film Preparation Method 1 later.

All properties described herein are measured according to their respective standard test methods described later unless explicitly indicated otherwise. Density is measured according to ASTM D792-13. Melt index ($I_2$) is measured according to ASTM D1238-04 (190° C., 2.16 kg).

Polyolefin blend. The polyolefin blend comprises a uniform dispersion of constituents (A) and (B). The term "uniform dispersion" refers to the constituents (A) and (B) as being mixed or blended together to an even extent, such that the resulting material is of constant composition of (A) and (B) throughout. The uniform dispersion of (A) and (B) may be liquid (melt) or a solid. The uniform dispersion may further contain a product of a reaction of some of (A) with some of (B) so as to form product (A)-(B).

In the polyolefin blend, the relative amount of (A) may be in the range of from 16 to 79 wt % and (B) in the range from 84 to 21 wt %, alternatively (A) may be in the range of from 24 to 76 wt % and (B) in the range from 76 to 24 wt %, alternatively (A) may be in the range of from 24 to 55 wt % and (B) in the range from 76 to 45 wt %; all based on total weight of (A) and (B).

In the polyolefin blend, the uniform dispersion of (A) and (B) is characterized by its own properties, which are different than such properties of (A) or (B) alone, or of a mixture of discrete particles of (A) and discrete particles of (B), such as a blend of pellets of (A) and pellets of (B). The inventive blend may include at least one enhanced property, relative to that of (A) or (B) alone, that includes the at least one enhanced optical property. An optional additional enhancement may include enhanced (increased) puncture resistance. An optional additional enhancement may include tear strength and/or tensile yield strength. Optionally the enhanced at least one property further may include dart impact and/or modulus.

In some aspects the polyolefin blend is independently further characterized by one of limitations (iv) to (vi): (iv) a normal comonomer distribution measured according to Gel Permeation Chromatography (GPC) Test Method (described later).

As an alternative or addition to the foregoing properties, the polyolefin blend may be characterized by its chemical composition, chemical composition distribution (CCD), density, melt viscosity ($\eta$), melt index ($I_2$, 190° C., 2.16 kg), melting transition temperature(s), molecular weight distribution (MWD=$M_w/M_n$), number average molecular weight ($M_n$), weight average molecular weight ($M_w$), or a combination of any two or more thereof.

The polyolefin blend may have an atomic chemical composition that consists essentially of, alternatively consists of C, H, and remainders of the Ziegler-Natta and metallocene catalysts. The atomic chemical composition of the Ziegler-Natta catalyst remainder may consist essentially of, alternatively consist of Ti, Mg, and Cl. The atomic chemical composition of the metallocene catalyst remainder may consist essentially of, alternatively consist of a Group 4 metal (e.g., Ti, Zr, or Hf), C, H, and, optionally, Cl, O, and/or N.

The polyolefin blend may have a density from 0.915 to 0.926 g/cm³, alternatively 0.920 to 0.926 g/cm³, alternatively 0.918±0.003 g/cm³, alternatively 0.918±0.002 g/cm³, alternatively 0.918±0.001 g/cm³, alternatively 0.918 g/cm³, all measured according to ASTM D792-13.

The polyolefin blend may have a melt index $I_2$ from 0.5 to 2.04 g/10 min., alternatively from 0.5 to 1.99 g/10 min., alternatively from 0.6 to 1.4 g/10 min., alternatively from 0.9 to 1.1 g/10 min., all measured according to ASTM D1238-04. The melt index of constituent (B) may be within ±0.3 g/10 min., alternatively within ±0.2 g/10 min., alternatively within ±0.1 g/10 min., of the melt index of constituent (A).

The polyolefin blend may have no detectable amount of long chain branching per 1,000 carbon atoms ("LOB Index"), measured according to LOB Test Method (described later). The polyolefin blend may be characterized by at least one optical property described later.

The polyolefin blend may be characterized by at least one of properties (ii) to (iii): (ii) tear strength (MD or CD) from 10 to 1,000 grams per 25 micrometers (g/25 μm), alternatively 20 to 900 g/25 μm, alternatively 50 to 500 g/25 μm, and (iii) tensile yield strength (MD or CD) from 5 to 15 megapascals (MPa), alternatively 6 to 14 MPa, alternatively 7 to 13 MPa. The properties may also include dart impact from 0 to 2,000 grams (g), alternatively 1 to 1,500 g, alternatively 5 to 1,000 g and/or modulus from 100 to 400 MPa.

Alternatively or additionally, the polyolefin blend may be characterized by characteristics of constituent (A), constituent (B), or both (A) and (B) prior to being blended. Prior to blending, each of (A) and (B) independently may be characterized by its chemical composition, CCD, density, melt viscosity ($\eta$), melt index ($I_2$, 190° C., 2.16 kg), melting transition temperature, MWD ($M_w/M_n$), $M_n$, $M_w$, or a combination of any two or more thereof. The constituents (A) and (B) of the polyolefin blend are composed of macromolecules. The macromolecules of (A), (B), or both (A) and (B) independently may consist of carbon and hydrogen atoms. As such the macromolecules (A) and/or (B) independently may be free of other heteroatoms (e.g., halogen, N, O, S, Si, and P). In some aspects (A) and (B) are independently characterized by their melt indexes ($I_2$, 190° C., 2.16 kg) and densities described later. For example, in some aspects (A) has a melt index ($I_2$, 190° C., 2.16 kg) from 0.5 to 1.99 g/10 min. and (B) has a melt index ($I_2$, 190° C., 2.16 kg) from 0.5 to 2.04 g/10 min.; alternatively (B) has a melt index ($I_2$, 190° C., 2.16 kg) from 0.5 to 1.99 g/10 min. and (A) has a melt index ($I_2$, 190° C., 2.16 kg) from 0.5 to 2.04 g/10 min.; alternatively both (A) and (B) each have a melt index ($I_2$, 190° C., 2.16 kg) from 0.5 to 1.99 g/10 min.

Constituent (A): Ziegler-Natta catalyst-made linear low density polyethylene (ZN-LLDPE). The ZN-LLDPE is manufactured by copolymerizing ethylene and an alpha-olefin comonomer in the presence of a Ziegler-Natta catalyst such as $TiCl_4$ disposed on a particulate $MgCl_2$ support. Ziegler-Natta catalysts are well known and include the Ziegler-Natta catalyst components and systems at column 12, lines 13 to 49; column 12, line 58, to column 13, line 25; and the cocatalysts at column 13, line 31 to column 14, line 28, of U.S. Pat. No. 7,122,607 B2 to Robert O. Hagerty, et al. The copolymerization process is generally well known and may be a slurry phase, solution phase, or gas phase process. For example a suitable gas phase process is at column 25, line 59, to column 26, line 21, and column 33, line 32, to column 35, line 56, of U.S. Pat. No. 7,122,607 B2.

The alpha-olefin comonomer used to make (A) may be a ($C_3$-$C_{20}$)alpha-olefin, alternatively a ($C_{11}$-$C_{20}$)alpha-olefin, alternatively a ($C_3$ to $C_{10}$)alpha-olefin, alternatively a ($C_4$-$C_8$)alpha-olefin, alternatively 1-butene or 1-hexene, alternatively 1-butene, alternatively 1-hexene, alternatively 1-octene. (A) may be characterized by its monomer content (i.e., ethylene monomeric content) and comonomer content (i.e., alpha-olefin comonomeric content). The alpha-olefin comonomeric units of (A) may be 1-butene comonomeric units, alternatively 1-hexene comonomeric units, alternatively 1-octene comonomeric units.

(A) may have a density from 0.905 to 0.930 g/cm³, alternatively 0.915 to 0.926 g/cm³, alternatively 0.920 to 0.926 g/cm³, alternatively 0.918±0.003 g/cm³, alternatively 0.918±0.002 g/cm³, alternatively 0.918±0.001 g/cm³, alternatively 0.918 g/cm³, all measured according to ASTM D792-13. (A) may have a melt index $I_2$ from 0.5 to 2.5 g/10 min., alternatively from 0.5 to 2.04 g/10 min., alternatively from 0.5 to 1.99 g/10 min., alternatively from 0.6 to 1.4 g/10 min., alternatively from 0.9 to 1.1 g/10 min., all measured according to ASTM D1238-04. (A) may have $M_w$ from 1,000 to 1,000,000 grams per mole (g/mol), alternatively from 10,000 to 500,000 g/mol, alternatively from 20,000 to 200,000 g/mol. (B) may have MWD ($M_w/M_n$) from 3.0 to 25, alternatively from 4 to 20, alternatively from 5 to 10.

Examples of (A) are commercially available and include DOW LLDPE DFDA 7047NT 7; Formosa Plastics FORMOLENE L42022B; Westlake Chemical Corporation's HIFOR LF1021 and NOVAPOL TD-9022; and Chevron Phillips' MARFLEX 7109 Polyethylene.

Constituent (B): metallocene catalyst-made linear low density polyethylene (MCN-LLDPE). The MCN-LLDPE is manufactured by copolymerizing ethylene and an alpha-olefin comonomer in the presence of a metallocene catalyst such as zirconocene. Metallocene catalysts are well known and include the metallocene catalyst components and systems at column 14, line 30, to column 20, line 67; and the activators and activator methods at column 21, line 1 to column 25, line 57, of U.S. Pat. No. 7,122,607 B2. The copolymerization process is generally well known and may be a slurry phase, solution phase, or gas phase process. For example a suitable gas phase process is at column 25, line 59, to column 26, line 21, and column 33, line 32, to column 35, line 56, of U.S. Pat. No. 7,122,607 B2.

The alpha-olefin comonomer used to make (B) may be a ($C_3$-$C_{20}$)alpha-olefin, alternatively a ($C_{11}$-$C_{20}$)alpha-olefin, alternatively a ($C_3$ to $C_{10}$)alpha-olefin, alternatively a ($C_4$-$C_8$)alpha-olefin, alternatively 1-butene or 1-hexene, alternatively 1-butene, alternatively 1-hexene, alternatively 1-octene. (B) may be characterized by its monomer content (i.e., ethylene monomeric content) and comonomer content (i.e., alpha-olefin comonomeric content). The alpha-olefin comonomeric units of (B) may be 1-butene comonomeric units, alternatively 1-hexene comonomeric units, alternatively 1-octene comonomeric units. The alpha-olefin comonomer used to make (B) may the same as, alternatively is different than the alpha-olefin used to make (A).

(B) may be characterized by the molecular catalyst used to make it. The molecular catalyst may be a metallocene, alternatively a zirconocene, alternatively a constrained geometry catalyst.

(B) may have a density from 0.905 to 0.930 g/cm$^3$, alternatively 0.915 to 0.926 g/cm$^3$, alternatively 0.920 to 0.926 g/cm$^3$, alternatively 0.918±0.003 g/cm$^3$, alternatively 0.918±0.002 g/cm$^3$, alternatively 0.918±0.001 g/cm$^3$, alternatively 0.918 g/cm$^3$, all measured according to ASTM D792-13. (B) may have a melt index $I_2$ from 0.5 to 2.5 g/10 min., alternatively from 0.5 to 2.04 g/10 min., alternatively from 0.5 to 1.99 g/10 min., alternatively from 0.6 to 1.4 g/10 min., alternatively from 0.9 to 1.1 g/10 min., all measured according to ASTM D1238-04. (B) may have $M_w$ from 1,000 to 1,000,000 g/mol, alternatively from 10,000 to 500,000 g/mol, alternatively from 20,000 to 200,000 g/mol. (B) may have MWD ($M_w/M_n$) from >2.00 to 3.0, alternatively from 2.01 to 2.9, alternatively from 2.1 to 2.5.

Examples of (B) are commercially available and include ExxonMobil EXCEED 1018HA, Ineos ELTEX PF6012AA; Chevron Phillips' MARFLEX D170Dk Polyethylene; Sabic's SUPEER 8118(L) mLLDPE; and TOTAL's Polyethylene LUMICENE M 1810 EP.

Polyolefin composition. The polyolefin composition comprises the polyolefin blend and the at least one additive, such as additive (C) to (M) described earlier. The inventive composition independently may, alternatively may not have a constant composition of the inventive blend and/or the at least one additive throughout. In some aspects the polyolefin composition comprises at least one of the (C) lubricant. Suitable lubricants are carbowax and metal stearates, (D) polymer processing aid (e.g., Dunamar FX), (E) antioxidant such as a primary antioxidant or a combination of primary and secondary antioxidants, (F) metal deactivator, (G) UV stabilizer (e.g., silica or carbon black), and (H) slip agent, (I) hindered amine stabilizer, (J) antiblock agent, (K) colorant, (L) antifog agent, and (M) antistatic agent. A suitable amount of each of the additives may be from >0 to 5 weight percent (wt %), alternatively 0.5 to 5 wt %, alternatively 1 to 2 wt %. The total weight of all constituents, including additives, in the polyolefin composition is 100.00 wt %.

The polyolefin blend and polyolefin composition may be substantially free of, alternatively may not contain, a polyolefin other than constituents (A) and (B). E.g., may be substantially free from or, alternatively does not contain, a conventional low density polyethylene (LDPE), a medium density polyethylene (MDPE), a high density polyethylene (HDPE), a poly(alpha-olefin), an ethylene/unsaturated carboxylic ester copolymer, a polyorganosiloxane, a poly(alkylene glycol), or a polystyrene.

The polyolefin composition may be made by any suitable method provided that (A) and (B) are blended together to give the polyolefin blend. The (A) and (B) may be blended together as described herein before being contacted with any additive. That is, the polyolefin blend containing the uniform mixture of (A) and (B) may be made, and then later the uniform mixture may be contacted with any optional additive (C) to (L) or constituent. Alternatively, the (A) and (B) may be blended together as described herein in the presence of one or more optional additives (C) to (L), if any, to give an embodiment of the polyolefin blend further containing the one or more additives. Typically for (C), the polyolefin blend is made, and then the (C) organic peroxide is added to the polyolefin blend to give the polyolefin composition.

To facilitate mixing of a preformed polyolefin blend of constituents (A) and (B) with the additive(s), the additive(s) may be provided in the form of an additive masterbatch, i.e., a dispersion of additive(s) in a carrier resin. Before making the preformed polyolefin blend, some of (A) or (B), or afterwards some of the preformed polyolefin blend of (A) and (B), may be set aside for use as the carrier resin.

Method of making the polyethylene blend. "Discrete solid particles and/or a discrete melt" means discrete solid particles, a discrete melt, or a combination thereof. In some aspects step (a) comprises dry blending discrete solid particles consisting essentially of, alternatively consisting of (A) with discrete solid particles consisting essentially of, alternatively consisting of (B) to give an aspect of the initial mixture consisting essentially of, alternatively consisting of solid particles of (A) and solid particles of (B). As used above "consisting essentially of" means one or more additives (C) to (L) may be present, but other polyolefins are absent. In some aspects step (a) comprises melt blending a melt consisting essentially of, alternatively consisting of (A) with a melt consisting essentially of, alternatively consisting of (B) to give an aspect of the initial mixture consisting essentially of, alternatively consisting of a melt of (A) and a melt of (B). In some aspects step (a) is a combination of both of the foregoing aspects. The amount of (A) and the amount of (B) used in the method may be measured and selected so as to give an aspect of the polyethylene blend having a specific wt % of (A) in the range of from 15 to 75 wt % and a specific wt % of (B) in the range from 85 to 25 wt %, based on total weight of (A) and (B), or each in any one of the alternative ranges thereof described earlier.

In the method of making the polyethylene blend, in some aspects step (b) comprises heating an aspect of the initial mixture of step (a) containing solid particles of (A) having a first melting temperature and/or heating solid particles of (B) having a second melting temperature above the highest one of the first and second melting temperatures to give the complete melt of (A) and (B). The aspect of the initial mixture may also contain, alternatively may not contain a partial melt of (A) and/or a partial melt of (B). In some aspects step (b) heating is performed in an extruder such as a single screw or twin screw extruder configured with a heating device.

In some aspects step (b) of the method of making the polyethylene blend is unnecessary if step (a) comprises the melt blending a melt consisting essentially of, alternatively consisting of (A) with a melt consisting essentially of, alternatively consisting of (B) to give an aspect of the initial mixture consisting essentially of, alternatively consisting of a melt of (A) and a melt of (B). In the latter aspects the initial mixture of step (a) is free of solid particles of (A) and (B).

In the method of making the polyethylene blend, in some aspects step (c) comprises using the extruder (e.g., the single screw or twin screw extruder) to blend the complete melt of step (b) to an even extent to give the polyolefin blend as a uniform melt blend of constant composition of (A) and (B) throughout.

In the method of making the polyethylene blend, in some aspects step (d) comprises passive cooling (natural cooling without using energy), alternatively active cooling (using energy to remove heat) of the uniform melt blend to a temperature below its solidification temperature, thereby giving the polyolefin blend as a solid uniform dispersion of constant composition of (A) and (B) throughout. The cooling may be performed at a controlled rate during the temperature range in which the polyethylene blend or its constituents (A) and (B) solidify, thereby controlling the morphology of the solidified polyethylene blend.

The polyethylene film. In some aspects the polyethylene film has a thickness from 0.0102 to 0.254 mm (0.400 mil to 10 mils), alternatively from 0.01143 mm to 0.254 mm (0.450 mil to 10 mils), alternatively from 0.01143 mm to 0.127 mm (0.450 mil to 5.00 mils), alternatively from 0.01143 mm to 0.0762 mm (0.450 mil to 3.00 mils), alternatively from 0.0127 mm to 0.0635 mm (0.500 mil to 2.50 mils). In some aspects the polyethylene film is made as an aspect of the method of making the polyethylene blend or composition. In such aspects the polyethylene film may be made after step (c) blending and before step (d) cooling, both of the method of making the polyethylene blend or composition. In some such aspects the polyethylene film is made by a method that comprises: (a) dry blending discrete solid particles consisting essentially of, alternatively consisting of (A) with discrete solid particles consisting essentially of, alternatively consisting of (B) to give an aspect of the initial mixture consisting essentially of, alternatively consisting of solid particles of (A) and solid particles of (B); (b) heating the initial mixture to give the complete melt of constituents (A) and (B); (c) blending the complete melt to an even extent to give the polyolefin blend as a uniform melt blend of constant composition of (A) and (B) throughout; (d) blowing the uniform melt blend so as to form a film and cool same to give the polyolefin blend as a polyethylene film aspect of the manufactured article.

The polyethylene film may be made using any blown-film-line machine configured for making polyethylene films. The machine may be configured with a feed hopper in fluid communication with an extruder in heating communication with a heating device capable of heating a polyethylene in the extruder to a temperature of up to 500° C. (e.g., 430° C.), and wherein the extruder is in fluid communication with a die having an inner diameter of 20.3 centimeters (8 inches) and a fixed die gap (e.g., 1.778 millimeter gap (70 mils)), a blow up ratio of 2.5:1, and a Frost Line Height (FLH) of 76±10 centimeters (30±4 inches) from the die. Step (a) may be done in the feed hopper. Steps (b) and (c) may be done in the extruder and at a temperature of 400° to 450° C. (e.g., 430° C.). Step (d) may be done in the die and after exiting the die. The machine may have capacity of a feed rate of (A) and (B), and production rate of film, from 50 to 200 kilograms (kg) per hour, e.g., 91 kg (201 pounds) per hour at 430° C.

The polyethylene film is useful for making containers and wraps that have at least one enhanced optical property. Examples of such containers are bags such as ice bags and grocery bags. Examples of such wraps are stretch films, meat wraps, and food wraps. The inventive blend and composition are also useful in a variety of non-film related applications including in vehicle parts.

Advantageously we discovered that the polyolefin blend and polyolefin composition have improved (i) at least one optical property relative to that of constituent (A) alone and constituent (B) alone. In some aspects the at least one optical property, measured according to the ASTM methods described herein using a film having a thickness of 0.0127 millimeter (0.500 mil), is clarity (Zebedee), gloss (specular), or haze. In some aspects the enhancement of clarity (Zebedee) is from 3% to 35%, alternatively from 3% to 33%, alternatively from 10% to 32%, all when tested according to ASTM D1746-15, relative to expected clarity (Zebedee) at the same weight fraction concentration as derived from a comparative trend line for actual comparative clarity (Zebedee) values at 100% ZN-LLDPE and 100 wt % MCN-LLDPE. In some aspects the enhancement of gloss (specular) using a film having a thickness of 0.0127 millimeter (0.500 mil) is from 20% to 70%, alternatively from 25% to 65%, alternatively from 30% to 65%, all when tested according to ASTM D2457-13, relative to expected gloss (specular) values at the same weight fraction concentration as derived from a comparative trend line for actual comparative gloss (specular) values at 100% ZN-LLDPE and 100 wt % MCN-LLDPE. In some aspects the enhancement of haze using a film having a thickness of 0.0127 millimeter (0.500 mil) is from 10% to 70%, alternatively from 15% to 65%, alternatively from 20% to 60%, all when tested according to ASTM D1003-13, relative to expected haze values at the same weight fraction concentration as derived from a comparative trend line for actual comparative haze values at 100% ZN-LLDPE and 100 wt % MCN-LLDPE. In some aspects the polyolefin blend is characterized by, and a greater at least one optical property enhancement is obtained with, constituents (A) and (B) wherein the melt index ("$I_2$", 190° C., 2.16 kg) of constituent (B) is within ±0.4 g/10 min., alternatively ±0.2 g/10 min., alternatively ±0.1 g/10 min. of the melt index ("$I_2$", 190° C., 2.16 kg) of constituent (A).

In some aspects the film of the polyolefin blend is characterized by a combination of composition, properties and characteristics that may give extra enhancement of optical clarity-Zebedee, gloss, and/or haze. In some such aspects the blend is composed of (A) having 1-butene comonomeric units and a melt index value of 1.0±0.1 g/10 min. and (B) having a melt index value of 1.0±0.1 g/10 min. The melt index values are ("$I_2$", 190° C., 2.16 kg) measured according to ASTM D1238-04. In some such embodiments, the film may have a thickness of 0.0127 mm (0.5 mil) and weight fractions of (A) and (B) in a range from 75 wt % (A)/25 wt % (B) to 25 wt % (A)/75 wt % (B). In other such aspects the film may have a thickness of 0.0381 mm (1.5 mil); and a weight fraction of (A) and (B) of 25 wt % (A)/75 wt % (B). In some such embodiments, the film may have a thickness of 0.0635 mm (2.5 mils) and a weight fraction of (A) and (B) of 25 wt % (A)/75 wt % (B) or 75 wt % (A)/25 wt % (B). In some such embodiments, the film may have a thickness of 0.0127 to 0.635 mm (0.5 mil to 2.5 mils) and weight fractions of (A) and (B) in a range from 75 wt % (A)/25 wt % (B) to 25 wt % (A)/75 wt % (B).

In some such aspects the blend is composed of (A) having 1-butene comonomeric units and a melt index value of 2.0±0.1 g/10 min. and (B) having a melt index value of 1.0±0.1 g/10 min. The melt index values are ("$I_2$", 190° C., 2.16 kg) measured according to ASTM D1238-04. In some such embodiments, the film may have a thickness of 0.0127 to 0.0381 mm (0.5 to 1.5 mil) and weight fractions of (A) and (B) in a range from 75 wt % (A)/25 wt % (B) to 25 wt % (A)/75 wt % (B). In other such aspects the film may have a thickness of 0.0381 to 0.0635 mm (1.5 to 2.5 mils); and a weight fraction of (A) and (B) of 25 wt % (A)/75 wt % (B).

In some such aspects the blend is composed of (A) having 1-hexene comonomeric units and a melt index value of 1.0±0.1 g/10 min. and (B) having a melt index value of 1.0±0.1 g/10 min. The melt index values are ("$I_2$", 190° C., 2.16 kg) measured according to ASTM D1238-04. In some such embodiments, the film may have a thickness of 0.0127 to 0.0635 mm (0.5 mil to 2.5 mils) and weight fractions of (A) and (B) in a range from 75 wt % (A)/25 wt % (B) to 25 wt % (A)/75 wt % (B). In some such embodiments, the film may have a thickness of 0.0127 to 0.0381 mm (0.5 to 1.5 mil) and weight fractions of (A) and (B) in a range from 50 wt % (A)/50 wt % (B) to 25 wt % (A)/75 wt % (B). In some such embodiments, the film may have a thickness of 0.0127 mm (0.5 mil) and a weight fraction of (A) and (B) of 25 wt % (A)/75 wt % (B). In some such embodiments, the film may have a thickness of 0.038 mm (1.5 mil) and weight fractions of (A) and (B) in a range from 75 wt % (A)/25 wt % (B) to 25 wt % (A)/75 wt % (B). In some such embodiments, the film may have a thickness of 0.0635 mm (2.5 mils) and weight fractions of (A) and (B) in a range from 50 wt % (A)/50 wt % (B) to 25 wt % (A)/75 wt % (B).

Olefin polymerization catalysts include Ziegler-Natta catalysts, Chrome catalysts, and molecular catalysts. Ziegler-Natta (Z-N) such as $TiCl_4/MgCl_2$ and Chrome catalysts such as a chromium oxide/silica gel are heterogeneous in that their catalytic sites are not derived from a single molecular species. Heterogeneous catalysts produce polyolefins with broad molecular weight distributions (MWD) and broad chemical composition distributions (CCD). A molecular catalyst is homogeneous in that it theoretically has a single catalytic site that is derived from a ligand-metal complex molecule with defined ligands and structure. As a result, molecular catalysts produce polyolefins with narrow CCD and narrow MWD, approaching but in practice not reaching the theoretical limit of Mw/Mn=2. Metallocenes are molecular catalysts that contain unsubstituted cyclopentadienyl ligands (Cp). Post-metallocene are derivatives of metallocenes that contain one or more substituted CP ligands, such as constrained geometry catalysts, or are non-sandwich complexes. Examples of post-metallocene catalysts are bis-phenylphenoxy catalysts, constrained geometry catalysts, imino-amido type catalysts, pyridylamide catalysts, imino-enamido catalysts, aminotroponiminato catalysts, amidoquinoline catalysts, bis(phenoxyimine) catalysts, and phosphinimide catalysts.

A compound includes all its isotopes and natural abundance and isotopically-enriched forms. The enriched forms may have medical or anti-counterfeiting uses.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyolefin or C, H, and O required by an alcohol) are not excluded.

The following apply unless indicated otherwise. Alternatively precedes a distinct embodiment. AEIC means Association of Edison Illuminating Companies, Birmingham, Ala., USA. ASTM means the standards organization, ASTM International, West Conshohocken, Pa., USA. IEC means the standards organization, International Electrotechnical Commission, Geneva, Switzerland. ISO means the standards organization, International Organization for Standardization, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). PPM are weight based. Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C. Substantially free of a specific material means 0 to 1 wt %, alternatively 0 to <0.1 wt %, alternatively 0 wt % of the material. Substituted when referring to a compound means having, in place of hydrogen, one or more substituents, up to and including per substitution.

Unless noted otherwise herein, use the following preparations for characterizations.

Blend and Film Preparation Methods 1. A blown-film-line machine configured for making polyethylene films with a feed hopper in fluid communication with an extruder in heating communication with a heating device heated to a temperature of 430° C. The extruder is in fluid communication with a die having a fixed die gap of 1.778 millimeter (70 mils), a blow up ratio of 2.5:1. The Frost Line Height (FLH) is 76±10 centimeters (30±4 inches) from the die. The machine used a feed rate of (A) and (B), and production rate of film, of 91 kg (201 pounds) per hour at 430° C.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter ($g/cm^3$).

Long Chain Branching (LCB) Test Method: calculate number of long chain branches (LCB) per 1,000 carbon atoms of a test polymer using a correlation developed by Janzen and Colby (*J. Mol. Struct.*, 485/486, 569-584 (1999)) between zero shear viscosity, $\eta_o$, and $M_w$. Their correlation is drawn as a reference line on a reference graph of $\eta_o$ on the y-axis and $M_w$ on the x-axis. Then a test polymer is characterized by (a) and (b): (a) using the Zero Shear Viscosity Determination Method described later, measuring the test polymer's small-strain (10%) oscillatory shear, and using a three parameter Carreau-Yasuda empirical model ("CY Model") to determine values for $\eta_o$ therefrom; and (b) using the Weight-Average Molecular Weight Test Method described later, measuring the test polymer's $M_w$. Plot the results for the test polymer's $\eta_o$ and $M_w$ on the reference graph, and compare them to the reference line. Results for test polymers with zero (0) long chain branching per 1,000 carbon atoms will plot below the Janzen and Colby reference line, whereas results for test polymers having long chain branching >0 per 1,000 carbon atoms will plot above the Janzen and Colby reference line. The CY Model is well-known from R. B. Bird, R. C. Armstrong, & O. Hasseger, *Dynamics of Polymeric Liquids, Volume* 1, *Fluid Mechanics*, $2^{nd}$ Edition, John Wiley & Sons, 1987; C. A. Hieber & H. H. Chiang, *Rheol. Acta*, 1989, 28: 321; and C. A. Hieber & H. H. Chiang, *Polym. Eng. Sci.*, 1992, 32: 931.

Melt index (190° C., 2.16 kilograms (kg), "$I_2$") Test Method: for ethylene-based (co)polymer is measured according to ASTM D1238-04, *Standard Test Method for*

*Melt Flow Rates of Thermoplastics by Extrusion Plastometer*, using conditions of 190° C./2.16 kilograms (kg), formerly known as "Condition E" and also known as $I_2$. Report results in units of grams eluted per 10 minutes (g/10 min.) or the equivalent in decigrams per 1.0 minute (dg/1 min.). 10.0 dg=1.00 g. Melt index is inversely proportional to the weight average molecular weight of the polyethylene, although the inverse proportionality is not linear. Thus, the higher the molecular weight, the lower the melt index.

Optical Clarity-Zebedee Test Method: ASTM D1746-15, *Standard Test Method for Transparency of Plastic Sheeting*. Measure clarity using a Zebedee CL-100 Meter. Express clarity as the percentage ratio of the intensity of light with specimen and without specimen in the path of light.

Optical Gloss Test Method: ASTM D2457-13, *Standard Test Method for Specular Gloss of Plastic Films and Solid Plastics*. Measure specular gloss using a glassometer at incident angles 20°, 45°, 60°, or 75°. Specular gloss is unitless.

Optical Haze Test Method: D1003-13, *Standard Test Method for Haze and Luminous Transmittance of Transparent Plastics*. Measure haze using a hazemeter. Express haze as percentage of luminous transmission which in passing through the film deviates from an incident beam by forward scattering.

Weight-Average Molecular Weight Test Method: determine $M_w$, number average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $a_{PS}$=0.67, $K_{PS}$=0.000175, and $a_X$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: $c=K_{DRI}I_{DRI}/(dn/dc)$, wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341].

Zero Shear Viscosity Determination Method: perform small-strain (10%) oscillatory shear measurements on polymer melts at 190° C. using an ARES-G2 Advanced Rheometric Expansion System, from TA Instruments, with parallel-plate geometry to obtain complex viscosity |η*| versus frequency (ω) data. Determine values for the three parameters—zero shear viscosity, $\eta_o$, characteristic viscous relaxation time, $\tau_\eta$, and the breadth parameter, a,—by curve fitting the obtained data using the following CY Model:

$$|\eta^*(\omega)| = \frac{\eta_o}{[1 + (\tau_\eta \omega)^a]^{\frac{(1-n)}{a}}},$$

wherein |η*(ω)| is magnitude of complex viscosity, $\eta_o$ is zero shear viscosity, $\tau_\eta$ is viscous relaxation time, a is the breadth parameter, n is power law index, and ω is angular frequency of oscillatory shear.

EXAMPLES

Constituent (A1): a ZN-LLDPE characterized by 1-butene comonomeric content, a density of 0.918 g/cm$^3$, and a melt index $I_2$ of 1.0 g/10 min.

Constituent (A2): a ZN-LLDPE characterized by 1-butene comonomeric content, a density of 0.918 g/cm$^3$, and a melt index $I_2$ of 2.0 g/10 min.

Constituent (A3): a ZN-LLDPE characterized by 1-hexene comonomeric content, a density of 0.918 g/cm$^3$, and a melt index $I_2$ of 1.0 g/10 min.

Constituent (B1): a MCN-LLDPE characterized by 1-hexene comonomeric content, a density of 0.918 g/cm$^3$, and a melt index $I_2$ of 1.0 g/10 min.

Comparative Example 1a (CE1a): a 0.0127 mm thick film of 100 wt % (A1).

Comparative Example 1b (CE1b): a 0.0127 mm thick film of 100 wt % (B1).

Comparative Example 2a (CE2a): a 0.0127 mm thick film of 100 wt % (A2).

Comparative Example 2b (CE2b): a 0.0127 mm thick film of 100 wt % (B1).

Comparative Example 3a (CE3a): a 0.0127 mm thick film of 100 wt % (A3).

Comparative Example 3b (CE3b): a 0.0127 mm thick film of 100 wt % (B1).

Inventive Example 1a (IE1a): a polyolefin blend and a 0.0127 mm thick film of 75 wt % (A1) and 25 wt % (B1).

Inventive Example 1b (IE1b): a polyolefin blend and a 0.0127 mm thick film of 50 wt % (A1) and 50 wt % (B1).

Inventive Example 1c (IE1c): a polyolefin blend and a 0.0127 mm thick film of 25 wt % (A1) and 75 wt % (B1).

Inventive Example 2a (IE2a): a polyolefin blend and a 0.0127 mm thick film of 75 wt % (A2) and 25 wt % (B1).
Inventive Example 2b (IE2b): a polyolefin blend and a 0.0127 mm thick film of 50 wt % (A2) and 50 wt % (B1).
Inventive Example 2c (IE2c): a polyolefin blend and a 0.0127 mm thick film of 25 wt % (A2) and 75 wt % (B1).
Inventive Example 3a (IE3a): a polyolefin blend and a 0.0127 mm thick film of 75 wt % (A3) and 25 wt % (B1).
Inventive Example 3b (IE3b): a polyolefin blend and a 0.0127 mm thick film of 50 wt % (A3) and 50 wt % (B1).
Inventive Example 3c (IE3c): a polyolefin blend and a 0.0127 mm thick film of 25 wt % (A3) and 75 wt % (B1).

The comparative and inventive films (0.0127 mm thickness, 0.5 mil) were tested for optical clarity-Zebedee according to Optical Clarity-Zebedee Test Method. Compositions and test results are reported below in Tables 1A to 3A.

TABLE 1A

Compositions (1.0 MI 1-butene ZN-LLDPE/1.0 MI MCN-LLDPE) and Clarity Test Results. ("0" means 0.00)

| Constituent (wt %) | CE1a | IE1a | IE1b | IE1c | CE1b |
|---|---|---|---|---|---|
| ZN-LLDPE (A1) | 100 | 75 | 50 | 25 | 0 |
| MCN-LLDPE (B1) | 0 | 25 | 50 | 75 | 100 |
| Example Total | 100.00 | 100.00 | 100.00 | 100.00 | 100.00 |
| Actual Clarity-Zebedee transmittance (%) | 63.0 | 76.5 | 72.8 | 65.2 | 60.5 |
| Comparative trend line Clarity-Zebedee (%) | 63.0 | 62.4 | 61.8 | 61.1 | 60.5 |
| Clarity Enhancement (% transmittance) | 0 | 14.1 | 11.0 | 4.1 | 0 |
| Clarity Enhancement (%) | 0 | 22.6 | 17.8 | 6.7 | 0 |

TABLE 2A

Compositions (2.0 MI 1-butene ZN-LLDPE/1.0 MI MCN-LLDPE) and Clarity Test Results. ("0" means 0.00)

| Constituent (wt %) | CE2a | IE2a | IE2b | IE2c | CE2b |
|---|---|---|---|---|---|
| ZN-LLDPE (A2) | 100 | 75 | 50 | 25 | 0 |
| MCN-LLDPE (B1) | 0 | 25 | 50 | 75 | 100 |
| Example Total | 100.00 | 100.00 | 100.00 | 100.00 | 100.00 |
| Actual Clarity-Zebedee transmittance (%) | 55.0 | 63.6 | 75.6 | 61.1 | 60.5 |
| Comparative trend line Clarity-Zebedee (%) | 55.0 | 56.4 | 57.8 | 59.1 | 60.5 |
| Clarity Enhancement (% transmittance) | 0 | 7.2 | 17.8 | 2.0 | 0 |
| Clarity Enhancement (%) | 0 | 12.8 | 30.8 | 3.4 | 0 |

TABLE 3A

Compositions (1.0 MI 1-hexene ZN-LLDPE/1.0 MI MCN-LLDPE) and Clarity Test Results. ("0" means 0.00)

| Constituent (wt %) | CE3a | IE3a | IE3b | IE3c | CE3b |
|---|---|---|---|---|---|
| ZN-LLDPE (A3) | 100 | 75 | 50 | 25 | 0 |
| MCN-LLDPE (B1) | 0 | 25 | 50 | 75 | 100 |
| Example Total | 100.00 | 100.00 | 100.00 | 100.00 | 100.00 |
| Actual Clarity-Zebedee transmittance (%) | 65.3 | 76.7 | 74.6 | 74.0 | 60.5 |
| Comparative trend line Clarity-Zebedee (%) | 65.3 | 64.1 | 62.9 | 61.7 | 60.5 |
| Clarity Enhancement (% transmittance) | 0 | 12.6 | 11.7 | 12.3 | 0 |
| Clarity Enhancement (%) | 0 | 19.7 | 18.6 | 19.9 | 0 |

Clarity enhancement (% transmittance)=actual Clarity-Zebedee transmittance (%)–% transmittance expected from comparative trend line, expressed in %, wherein "–" indicates subtraction. Clarity enhancement (%)=clarity enhancement (% transmittance)/(% transmittance expected from comparative trend line), expressed as a percentage, wherein "/" indicates division. The greater the increase in clarity-Zebedee transmittance relative to the comparative trend line clarity transmittance, the greater the clarity enhancement.

The comparative and inventive films (0.0127 mm thickness, 0.5 mil) were tested for optical gloss according to Optical Gloss Test Method. Compositions and test results are reported below in Tables 1B to 3B.

TABLE 1B

Compositions (1.0 MI 1-butene ZN-LLDPE/1.0 MI MCN-LLDPE) and Gloss Test Results. ("0" means 0.00)

| Constituent (wt %) | CE1a | IE1a | IE1b | IE1c | CE1b |
|---|---|---|---|---|---|
| ZN-LLDPE (A1) | 100 | 75 | 50 | 25 | 0 |
| MCN-LLDPE (B1) | 0 | 25 | 50 | 75 | 100 |
| Example Total | 100.00 | 100.00 | 100.00 | 100.00 | 100.00 |
| Actual Gloss, specular (at 45°) | 33.0 | 48.7 | 57.4 | 61.5 | 25.4 |
| Comparative trend line Gloss (at 45°) | 33.0 | 31.1 | 29.2 | 27.3 | 25.4 |
| Gloss (at 45°) Enhancement | 0 | 17.6 | 28.2 | 34.2 | 0 |
| Gloss (at 45°) Enhancement (%) | 0 | 56.6 | 49.1 | 55.6 | 0 |

TABLE 2B

Compositions (2.0 MI 1-butene ZN-LLDPE/1.0 MI MCN-LLDPE) and Gloss Test Results. ("0" means 0.00)

| Constituent (wt %) | CE2a | IE2a | IE2b | IE2c | CE2b |
|---|---|---|---|---|---|
| ZN-LLDPE (A2) | 100 | 75 | 50 | 25 | 0 |
| MCN-LLDPE (B1) | 0 | 25 | 50 | 75 | 100 |
| Example Total | 100.00 | 100.00 | 100.00 | 100.00 | 100.00 |
| Actual Gloss, specular (at 45°) | 19.3 | 31.4 | 36.0 | 57.5 | 25.4 |
| Comparative trend line Gloss (at 45°) | 19.3 | 20.8 | 22.4 | 23.9 | 25.4 |
| Gloss (at 45°) Enhancement | 0 | 10.6 | 13.6 | 33.6 | 0 |
| Gloss (at 45°) Enhancement (%) | 0 | 33.8 | 37.8 | 58.4 | 0 |

TABLE 3B

Compositions (1.0 MI 1-hexene ZN-LLDPE/1.0 MI MCN-LLDPE) and Gloss Test Results. ("0" means 0.00)

| Constituent (wt %) | CE3a | IE3a | IE3b | IE3c | CE3b |
|---|---|---|---|---|---|
| ZN-LLDPE (A3) | 100 | 75 | 50 | 25 | 0 |
| MCN-LLDPE (B1) | 0 | 25 | 50 | 75 | 100 |
| Example Total | 100.00 | 100.00 | 100.00 | 100.00 | 100.00 |
| Actual Gloss, specular (at 45°) | 40.6 | 36.0 | 42.2 | 47.8 | 25.4 |
| Comparative trend line Gloss (at 45°) | 40.6 | 36.8 | 33.0 | 29.2 | 25.4 |
| Gloss (at 45°) Enhancement | 0 | (0.8) | 9.1 | 18.6 | 0 |
| Gloss (at 45°) Enhancement (%) | 0 | (2.2) | 27.6 | 63.7 | 0 |

Gloss enhancement (% reflectance)=actual gloss reflectance (%)–% reflectance expected from comparative trend line, expressed in %, wherein "–" indicates subtraction. Gloss enhancement (%)=gloss enhancement (% reflectance)/(% reflectance expected from comparative trend line), expressed as a percentage, wherein "/" indicates division. The greater the increase in actual gloss reflectance relative to the comparative trend line gloss reflectance, the greater the gloss enhancement.

The comparative and inventive films (0.0127 mm thickness, 0.5 mil) were tested for optical haze according to Optical Haze Test Method. Compositions and test results are reported below in Tables 1C to 3C.

TABLE 1C

Compositions (1.0 MI 1-butene ZN-LLDPE/1.0 MI MCN-LLDPE) and Haze Test Results. ("0" means 0.00)

| Constituent (wt %) | CE1a | IE1a | IE1b | IE1c | CE1b |
|---|---|---|---|---|---|
| ZN-LLDPE (A1) | 100 | 75 | 50 | 25 | 0 |
| MCN-LLDPE (B1) | 0 | 25 | 50 | 75 | 100 |
| Example Total | 100.00 | 100.00 | 100.00 | 100.00 | 100.00 |
| Actual Haze (%) | 17.5 | 11.1 | 8.4 | 7.6 | 20.1 |
| Comparative trend line Haze (%) | 17.5 | 18.3 | 18.8 | 19.4 | 20.1 |
| Haze Enhancement (% deviated) | 0 | 7.2 | 10.4 | 11.8 | 0 |
| Haze Enhancement (%) | 0 | 39.3 | 55.3 | 60.8 | 0 |

TABLE 2C

Compositions (2.0 MI 1-butene ZN-LLDPE/1.0 MI MCN-LLDPE) and Haze Test Results. ("0" means 0.00)

| Constituent (wt %) | CE2a | IE2a | IE2b | IE2c | CE2b |
|---|---|---|---|---|---|
| ZN-LLDPE (A2) | 100 | 75 | 50 | 25 | 0 |
| MCN-LLDPE (B1) | 0 | 25 | 50 | 75 | 100 |
| Example Total | 100.00 | 100.00 | 100.00 | 100.00 | 100.00 |
| Actual Haze (%) | 26.6 | 17.6 | 13.8 | 8.8 | 20.1 |
| Comparative trend line Haze (%) | 26.6 | 25.0 | 23.3 | 21.7 | 20.1 |
| Haze Enhancement (% deviated) | 0 | 7.4 | 9.5 | 12.9 | 0 |
| Haze Enhancement (%) | 0 | 30 | 41 | 59.4 | 0 |

TABLE 3C

Compositions (1.0 MI 1-hexene ZN-LLDPE/1.0 MI MCN-LLDPE) and Haze Test Results. ("0" means 0.00)

| Constituent (wt %) | CE3a | IE3a | IE3b | IE3c | CE3b |
|---|---|---|---|---|---|
| ZN-LLDPE (A3) | 100 | 75 | 50 | 25 | 0 |
| MCN-LLDPE (B1) | 0 | 25 | 50 | 75 | 100 |
| Example Total | 100.00 | 100.00 | 100.00 | 100.00 | 100.00 |
| Actual Haze (%) | 12.6 | 21.2 | 13.0 | 12.1 | 20.1 |
| Comparative trend line Haze (%) | 12.6 | 14.4 | 16.3 | 18.2 | 20.1 |
| Haze Enhancement (% deviated) | 0 | 6.8 | 3.3 | 6.1 | 0 |
| Haze Enhancement (%) | 0 | 47 | 20 | 33 | 0 |

Haze enhancement (% deviated)=actual light deviated (%)–% light deviated expected from comparative trend line, expressed in %, wherein "–" indicates subtraction. Haze enhancement (%)=haze enhancement (% deviated)/(% light deviated expected from comparative trend line), expressed as a percentage, wherein "/" indicates division. The greater the decrease in actual amount light being deviated from 2.5° relative to the comparative trend line amount light being deviated from 2.5°, the greater the haze enhancement.

As shown by the data in Tables 1A to 3A, 1B to 3B, and 1C to 3C, the inventive polyethylene blends and films have weight fraction concentrations of 75 wt % ZN-LLDPE/25 wt % MCN-LLDPE, 50 wt % ZN-LLDPE/50 wt % MCN-LLDPE, and 25 wt % ZN-LLDPE/75 wt % MCN-LLDPE, and enhanced (increased) optical clarity, enhanced (increased) light reflectance or gloss, and enhanced (decreased) light deviated (haze) relative to the respective expected values at the same weight fraction concentrations as derived from their respective comparative trend lines for comparative such values at 100% ZN-LLDPE and 100 wt % MCN-LLDPE.

Optical clarity-Zebedee, gloss, and haze test results are also available for comparative that are identical to CE1a, CE1b, CE2a, CE2b, CE3a, and CE3b and inventive examples that are identical to IE1a to IE1c, IE2a to IE2c, and IE3a to IE3c except wherein thickness of the film is 0.0381 mm (1.5 mil) or 0.0635 mm (2.5 mils).

Incorporate by reference here the below claims as numbered aspects except replace "claim" and "claims" by "aspect" or "aspects," respectively.

The invention claimed is:

1. A polyethylene blend comprising a uniform dispersion of constituents (A) and (B): (A) a Ziegler-Natta catalyst-made linear low density polyethylene (ZN-LLDPE) and (B) a metallocene catalyst-made linear low density polyethylene (MCN-LLDPE);
   wherein the (A) ZN-LLDPE is from 24 to 76 weight percent (wt %) of the total weight of (A) and (B) and the (B) MCN-LLDPE is from 76 to 24 wt % of the total weight of (A) and (B); wherein by itself (A) is independently characterized by each of properties (i) to (iii): (i) a melt index ("$I_2$", 190° C., 2.16 kg) of 0.5 to 2.5 gram per 10 minutes (g/10 min.) measured according to ASTM D1238-04; (ii) a density from 0.905 to 0.930 gram per cubic centimeter (g/cm$^3$), measured according to ASTM D792-13; and (iii) no detectable amount of long chain branching per 1,000 carbon atoms ("LCB Index"), measured according to LCB Test Method; and wherein by itself (B) is independently characterized by each of properties (i) to (iii): (i) a melt index ("$I_2$", 190° C., 2.16 kg) of 0.5 to 2.5 g/10 min. measured according to ASTM D1238-04; (ii) a density from 0.905 to 0.930 g/cm$^3$, measured according to ASTM D792-13; and (iii) no detectable amount of long chain branching per 1,000 carbon atoms ("LCB Index"), measured according to LCB Test Method; and with the proviso that the density of constituent (B) is within ±0.001 g/cm$^3$ of the density of constituent (A); wherein the (A) ZN-LLDPE is made by copolymerizing ethylene and 1-butene in the presence of the Ziegler-Natta catalyst and the (B) MCN-LLDPE is made by copolymerizing ethylene and 1-hexene in the presence of the metallocene catalyst; and wherein the melt index of constituent (B) is within ±0.1 g/10 min. of the melt index of constituent (A).

2. The polyethylene blend of claim 1, further characterized by one of limitations (i) to (ii): (i) each of ZN-LLDPE and MCN-LLDPE is independently characterized by a melt index of ("$I_2$", 190° C., 2.16 kg) of 0.5 to 1.99 g/10 min.; and (ii) each of the ZN-LLDPE and MCN-LLDPE is independently characterized by a density of 0.918±0.003 g/cm$^3$.

3. The polyethylene blend of claim 1, when formed as a film having a thickness of 0.0127 millimeter (0.500 mil), is further characterized by any one of limitations (i) to (vii): (i) an improvement (increase) in optical clarity (Zebedee), relative to optical clarity (Zebedee) of a film of (A) alone or (B) alone, of from 3% to 35%, when tested according to the Optical Clarity-Zebedee Test Method; (ii) an improvement (increase) in gloss of 15% to 65%, when tested according to the Optical Gloss Test Method; or (iii) an improvement (decrease) in haze of from 15% to 65%, when tested according to the Optical Haze Test Method; or (iv) both (i) and (ii); (v) both (i) and (iii); (vi) both (ii) and (iii); or (vii) each of (i) to (iii).

4. A method of making the polyethylene blend of claim 1, the method comprising: (a) contacting discrete solid particles and/or a discrete melt of constituent (A) with discrete solid particles and/or a discrete melt of constituent (B) to give an initial mixture of (A) and (B); (b) heating any solid particles of (A) and any solid particles of (B) in the initial mixture above their melting temperature to give a complete melt of constituents (A) and (B); (c) blending the complete melt to an even extent to give the polyethylene blend as a uniform melt blend of constant composition of (A) and (B) throughout.

5. The method of claim 4, further comprising (d) cooling the uniform melt blend to a temperature below its solidification temperature, thereby giving the polyethylene blend as a solid of constant composition of (A) and (B) throughout.

6. A polyolefin composition comprising the polyethylene blend of claim 1 and at least one additive (constituent) (C) to (M): (C) a lubricant; (D) a polymer processing aid; (E) an antioxidant; (F) a metal deactivator; (G) an ultraviolet light-promoted degradation inhibitor ("UV stabilizer"); (H) a slip agent; (I) a hindered amine stabilizer; (J) an antiblock agent; (K) a colorant; (L) an antifog agent; and (M) an antistatic agent; with the proviso that the total amount of the at least one additive is from >0 to 5 wt % of the polyolefin composition and the polyethylene blend is from <100 to 80 wt % of the polyolefin composition.

7. A method of making the polyolefin composition of claim 6, the method comprising contacting the polyethylene blend with the at least one additive (C) to (M) to give the polyolefin composition.

8. A manufactured article comprising a shaped form of the polyethylene blend of claim 1.

9. A polyethylene film of the polyethylene blend of claim 1.

10. A method of making a polyethylene film, the method comprising blowing a melt of the polyethylene blend of claim 1, thereby giving the polyethylene film.

* * * * *